United States Patent [19]

Hein

[11] Patent Number: 5,374,038
[45] Date of Patent: Dec. 20, 1994

[54] AUTOMOTIVE TORQUE STRUT BUSHING

[75] Inventor: Richard D. Hein, Wabash, Ind.

[73] Assignee: GenCorp Inc., Fairlawn, Ohio

[21] Appl. No.: 53,984

[22] Filed: Apr. 27, 1993

[51] Int. Cl.⁵ ................ F16F 7/12; F16F 15/08
[52] U.S. Cl. .................. 267/140.5; 267/141.4
[58] Field of Search ........... 267/140.5, 141.1–141.4, 267/141.6, 141.7, 276, 281, 293; 248/560, 573, 604, 562, 636; 280/673; 16/2

[56] References Cited

U.S. PATENT DOCUMENTS

| | | | |
|---|---|---|---|
| 2,656,137 | 10/1953 | Leggett et al. | 248/5 |
| 3,168,270 | 2/1965 | Bligard et al. | 248/5 |
| 3,702,178 | 11/1972 | Schulz | 248/9 |
| 4,535,976 | 8/1985 | Dan et al. | 267/8 R |
| 4,588,174 | 5/1986 | Konishi | 267/140.12 |
| 4,667,764 | 5/1987 | Sawada et al. | 180/297 |
| 4,685,531 | 8/1987 | Kopich | 180/300 |
| 4,807,857 | 2/1989 | Wolf et al. | 248/636 X |
| 4,842,258 | 6/1989 | Misaka et al. | 267/140.1 |
| 4,871,152 | 10/1989 | Funahashi | 248/562 X |
| 5,024,425 | 6/1991 | Schwerdt | 267/293 X |
| 5,060,918 | 10/1991 | Kanda | 267/140.12 |
| 5,129,479 | 7/1992 | Fujii et al. | 180/297 |
| 5,154,403 | 10/1992 | Sato | 267/141.2 |

FOREIGN PATENT DOCUMENTS 9039 1/1987 Japan ................ 267/293

Primary Examiner—Douglas C. Butler
Assistant Examiner—Alfred Muratori
Attorney, Agent, or Firm—Robert F. Rywalski; David D. Murray; Frank C. Rote, Jr.

[57] ABSTRACT

A bushing for an automotive torque strut is described as having a resilient, elastomeric insert which is bonded to a rigid, inner sleeve, and provided with a plurality of resilient, elastomeric fingers which are flexible and not bonded to an outer sleeve or housing of the bushing. The fingers are specially located in the insert. In one embodiment, there are aligned pairs of oppositely disposed fingers which extend into large pie-shaped voids which are spaced on opposite sides of the inner sleeve. In the other embodiment, the insert is provided with radially oriented grooves and fingers which are alternately disposed around the inner sleeve.

20 Claims, 2 Drawing Sheets

AUTOMOTIVE TORQUE STRUT BUSHING

BACKGROUND OF THE INVENTION

This invention relates to torque struts which are coupled between a pair of automobile parts, normally in the area of the engine. More particularity, the invention relates to resilient elastomeric bushings which are used to dampen forces imparted to the torque struts during operation of a motor vehicle.

It is well known to form such bushings with a solid, resilient rubber insert or cushion. It is also well known to provide such inserts with large voids or cavities to vary the force dampening characteristics of the bushing, as exemplified by U.S. Pat. No. 4,685,531. Many elastomeric configurations have been used to provide vibration isolation while allowing varying degrees of engine roll. For example, some engines are allowed to move as little as plus or minus 6 mm, while other engines are allowed to move plus or minus 25 mm. The bushing of the invention meets two major design criteria; namely, it maintains acceptable stress levels during maximum loading conditions, and it maintains adequate axial push-out and alignment properties.

Briefly stated, the invention is in a torque strut bushing which comprises a resilient elastomeric insert which is between a rigid inner sleeve and a radially spaced, concentric, rigid outer sleeve in which the insert and attached inner sleeve is housed. The insert is bonded to the inner sleeve, and is provided with a number of grooves and fingers, both of which extend from the outer sleeve in the direction of the longitudinal axis of the inner sleeve and terminate in spaced relation from the inner sleeve. The grooves and fingers between them, are sized, such that the free distal ends of the fingers will flex limited distances about the longitudinal axis of the inner sleeve. A rigid, annular ring is circumferentially molded in the elastomeric material around the outer periphery of the insert midway between the opposing ends of the insert and attached inner sleeve.

The function of the grooves are two-fold; namely, they reduce radial spring rate and they increase allowable axial rotation of the resilient elastomeric insert and attached inner sleeve, since the fingers, formed between the grooves, tend to bend or flex rather than place the elastomeric insert in shear. The rigid ring provides additional axial push-out restraint and prevents misalignment of the bushing after large radial displacements. The elastomeric insert is not bonded to the outer sleeve or housing, so that it will never be placed in tension which adversely affects the durability of the insert.

DESCRIPTION OF THE DRAWING

The following description of the invention will be better understood by having reference to the accompanying drawing, wherein.

DETAILED DESCRIPTION OF THE DRAWING

Figure 1:
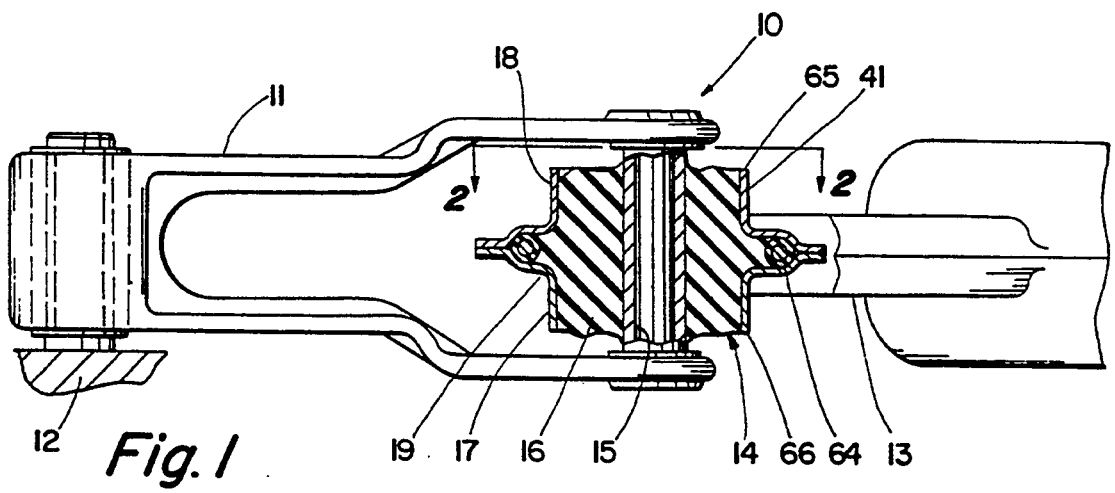
FIG. 1 is a side view of a torque strut which employs a bushing of the invention, portions of the bushing being removed to clarify assembly of the bushing.

With general reference to the drawing for like parts, and particular reference to FIGS. 1-5, there is shown an automotive torque strut 10 which, for example, comprises a bifurcated first arm 11 which is pivotally mounted on an automobile engine 12, and a second arm 13 which is secured to an automobile radiator (not shown) and pivotally mounted to the first arm 11. A bushing 14 of the invention is interposed between the two arms 11 and 13 to dampen forces imparted to the torque strut 10.

The bushing 14 comprises a rigid, hollow, cylindrical inner member or sleeve 15 to which is bonded a resilient, elastomeric, annular insert or cushion 16 which surrounds the inner sleeve 15 in concentric relation. The inner sleeve 15 is composed of any suitable rigid material, such as metal or a rigid plastic, and the insert is composed of any appropriate resilient elastomeric material, such as rubber. A rigid, outer sleeve or housing 17 surrounds the rubber insert 16 in concentric relation with the insert 16 and inner sleeve 15. The housing 17 is, likewise, composed of any suitable rigid material, such as metal or a rigid plastic.

The housing 17 is equally divided into two sections 18 and 19 which are mirror images of each other, and is designed to be secured together by any means, such as a number of similar bolts 20 and threadably attached nuts 21. The bushing 14 is assembled by placing the insert 16 and attached inner sleeve 15 into one of the housing sections, e.g. the first section 18, after which the remaining second section 19 is bolted in place against the first section 18 in surrounding relation around the remaining, exposed half of the insert 16. This method of assembling the bushing 14 is different from the normal procedure of forcing or press fitting the elastomeric insert 14 arid attached inner sleeve 15 into a one piece outer sleeve or housing 17 from one end thereof. The use of a multi-sectional outer sleeve or housing 17 is believed to be unique in the formation of bushings which have an annular elastomeric insert which is bonded and press fitted between two, radially spaced, cylindrical metal sleeves.

Figure 3:
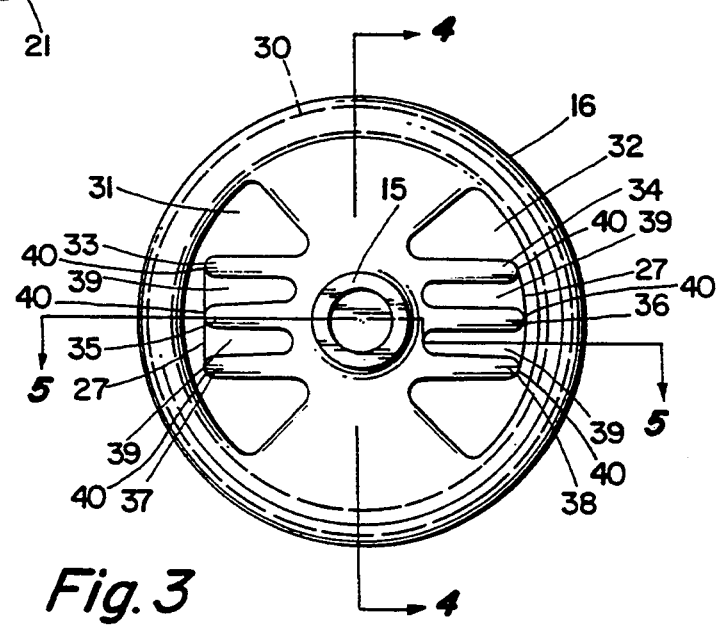
FIG. 3 is an enlarged plan view of the resilient elastomeric insert and attached inner sleeve of the bushing.
Figure 4:
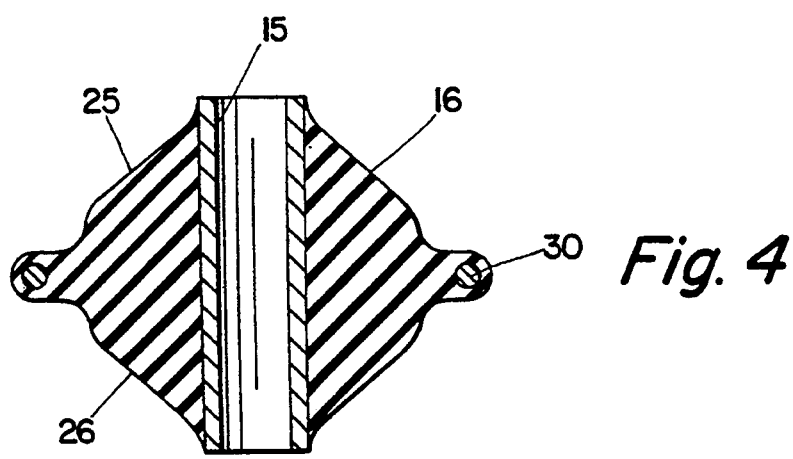
FIG. 4 is a section of the insert and inner sleeve viewed from the line 4—4 of FIG. 3.
Figure 5:
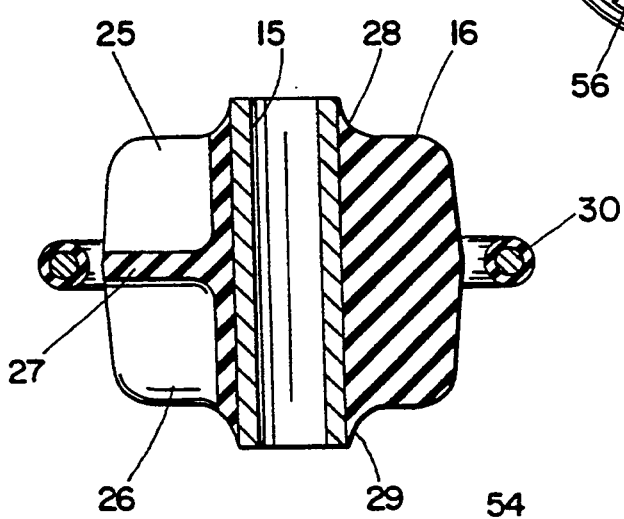
FIG. 5 is a section of the insert and inner sleeve viewed from the line 5—5 of FIG. 3.

For simplicity of description, it is assumed that the following resilient, elastomeric inserts and attached inner sleeves are vertically disposed. The insert 16, shown in FIGS. 3-5, is comprised of an upper section 25 which is a mirror image of a lower section 26. The two sections 25 and 26 are separated by a horizontal layer 27 of elastomeric material which is integrally formed with the insert 16, midway between the upper and lower ends 28 and 29 of the insert 16. A continuous, solid, annular metal ring 30 is circumferentially embedded in and around the insert 16 in the plane of the section dividing layer 27 of elastomeric material.

A pair of large, oppositely disposed voids 31 and 32, as best seen in FIG. 3, are vertically aligned in the upper and lower sections 25 and 26 of the insert 16 on opposite sides of the inner sleeve 15. The large voids 31 and 32 are generally pie-shaped in relation to the longitudinal axis of the inner sleeve 15, and could extend vertically through the insert 16. In each of the sections 25 and 26 of the insert 16, there are pairs of oppositely disposed and vertically aligned fingers 33 and 34, 35 and 36, and 37 and 38, which extend in parallel relation from adjacent the inner sleeve 15 into the large voids 31 and 32. The aforementioned pairs of fingers of the two sections 25 and 26 are vertically aligned and integrally formed with the insert 16 of elastomeric material. The fingers 33–38 in the upper and lower sections 25 and 26 of the insert 16 are separated by grooves or voids 39 which are in communication with the large voids 31 and 32. The fingers 33–38 extend longitudinally of the inner sleeve 15 and terminate in spaced relation from the surrounding metal ring 30. The width of each of the fingers 33–38 is substantially the same as the correspondingly measured width of each of the grooves 39, such that the similar, free distal ends 40 of the fingers 33–38, farthest spaced from the inner sleeve 15 and dividing layer 27 of elastomeric material between the upper and lower sections 25 and 26 of the insert 16, are free to flex a limited distance around the longitudinal axis of the inner sleeve 15.

In FIG. 5, the upper and lower sections 25 and 26 of the insert 16 resemble two truncated cones with slightly sloping sides and bases which are in abutting relationship, whereas in FIG. 4, such sections 25 and 26 resemble two cones with bases which are abutting relation. It can be appreciated from the above that the shape of the insert 16 will continuously change between those shown in FIGS. 4 and 5.

Figure 2:
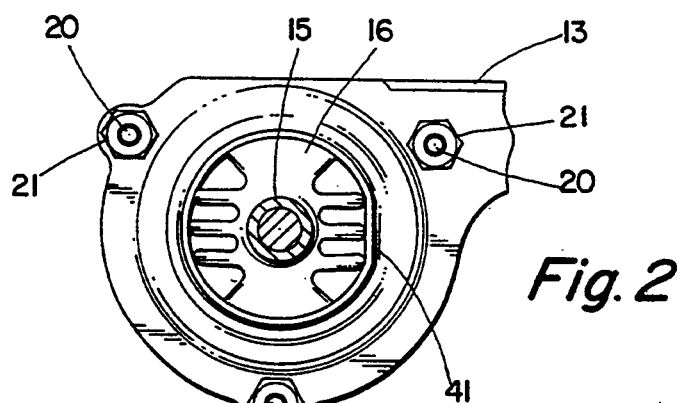
FIG. 2 is a plan view of the bushing, as seen from the line 2—2 of FIG. 1.

The foregoing description has been in relation to a resilient, elastomeric insert 16 which is concentrically disposed between the inner sleeve 15 and outer housing 17, and the fingers 33–38 are substantially equal, in length, such that the insert 16 and attached inner sleeve 15 can move, for example, an equal distance in opposite directions within the relatively fixed, outer housing 17. In some cases, it may be desirable to limit the travel of the insert 16 and attached inner sleeve 15 within the outer housing 17 in one of the opposing directions. Fingers, e.g. fingers 33, 35 and 37, on one side of the inner sleeve 15 are made shorter than the fingers, e.g. fingers 34, 36 and 38, on the opposite side of the inner sleeve 15, as seen in FIG. 2. A flat 41 is placed in the outer housing 17 in the area of the shorter fingers to abut the fingers and contact them upon initial movement, to facilitate limiting travel of the insert 16 and attached inner sleeve 15 within the housing 17 in the direction of the shorter fingers of the insert 16.

Figure 6:
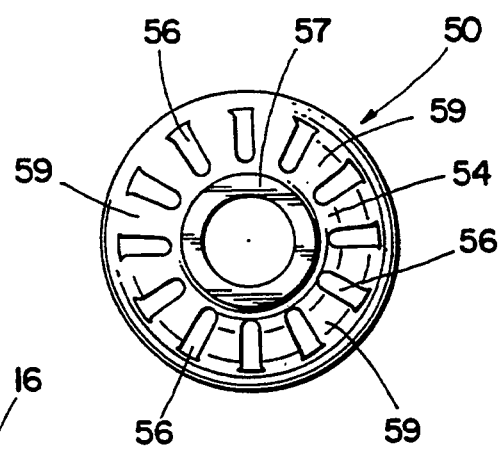
FIG. 6 is a plan view similar to FIG. 3, but of a different resilient elastomeric insert and inner sleeve.
Figure 7:
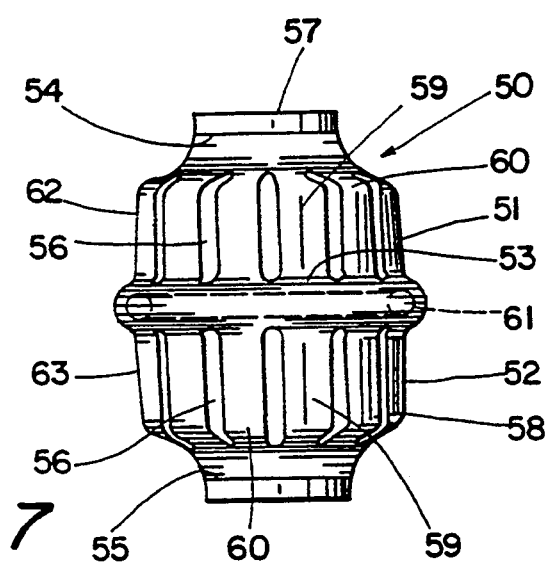
FIG. 7 is a side view of the insert of FIG. 6.

With particular reference to FIGS. 6 and 7, there is shown a different resilient elastomeric insert 50 which is also composed of rubber. The insert 50 is also divided into an upper section 51 which is a mirror image of a vertically aligned lower section 52 by an integrally formed, horizontal layer 53 of elastomeric material midway between the opposing ends 54 and 55 of the insert 50. A number of grooves 56 are disposed in each of the sections 51 and 52 of the insert 50 and extend in radial directions from the longitudinal axis of a rigid, inner, cylindrical metal member or sleeve 57 to which the insert 50 is bonded. The grooves or voids 56 start in spaced relation from the inner sleeve 57 and terminate at the outer periphery 58 of the insert 50 where they communicate with the ambient atmosphere surrounding the insert 50. As best seen in FIG. 7, the grooves 56 in the divided sections 51 and 52 of the insert 50, are in vertical alignment for ease of production.

Radially oriented fingers 59 are integrally formed with the insert 50 between adjacent pairs of grooves 56. The fingers 59 on the upper and lower sections 51 and 52 of the insert 50 are also in vertical alignment, as seen in FIG. 7. Each of the fingers 59 is generally pie-shaped in relation to the longitudinal axis of the inner sleeve 57 and has a width, measured at the outer periphery 58 of the insert 50, which is greater than the correspondingly measured width of each of the grooves 56. The relationship between the widths of such fingers 59 and grooves 56 is such that the similar, free distal ends 60 of the fingers 59, like those of the other insert 16, are free to flex a limited distance around the longitudinal axis of the inner sleeve 57.

A rigid, continuous annular ring 61 is embedded in the elastomeric material circumferentially around the insert 50 midway between the opposing ends 54 and 55 of the insert 50 in the plane of the dividing layer 53 of elastomeric material. The ring is composed of any suitable rigid material, such as metal. The outer walls 62 and 63 of the upper and lower sections 51 and 52 of the insert 50 diverge slightly towards each other to provide two truncated sections 51 and 52 which have a shape similar to that shown in FIG. 5 of the other insert 16. Such shape helps to facilitate the positioning of the insert 50 in the surrounding, outer housing 17, as shown in FIG. 1.

The positioning of the different inserts 16 and 50, is also simplified by the provision in the outer housing 15 of a circumferential recess 64, midway between the opposing ends 65 and 66 of the housing 15, for mating reception of the annular rings 30 and 61 which surround the different inserts 16 and 50. The shape of the housing 15 can be designed to matingly receive the different inserts 16 and 50, or it can be slightly altered to accommodate such inserts, depending on the spring rate desired of the bushing 14.

Thus, there has been described two unique bushings, both of which employ a number of flexible fingers which are separated by grooved voids or cavities which extend in spaced relation from the rigid inner sleeve to which the resilient elastomeric material of the bushing is bonded. It can be appreciated from the description that the fingers are not bonded or press fitted to an outer sleeve or housing like many other prior art bushings. Thus, the fingers are never in tension and free to flex laterally when loads are imparted to the bushing. The bushing insert of FIGS. 6 and 7 is designed for relatively small displacements, whereas the bushing insert of FIGS. 3–5 is designed for intermediate engine displacement.

What is claimed is:

1. A bushing for an automobile torque strut, comprising:
   a) an elongated, rigid inner member having a pair of longitudinal spaced opposing ends and concentric about a longitudinal axis;
   b) an insert composed of resilient, elastomeric material, the insert having a pair of opposing ends and a center opening for receiving the inner member, the insert being secured to the inner member;
   c) a plurality of grooves formed in the insert and extending in spaced relation from the inner member outwardly in directions away from the longitudinal axis of the inner member, the grooves also extending generally parallel to the longitudinal axis of the inner member;
   d) a plurality of resilient elastomeric fingers integrally formed in the insert by the grooves and extending generally parallel to the longitudinal axis of the inner member, the fingers and grooves being sized, such that free distal ends of the fingers are free to flex laterally relative to the planes of the fingers;

e) a rigid annular ring embedded in the resilient elastomeric material of the insert and surrounding the insert midway between the opposing ends of the insert; and f) a housing surrounding the insert in unsecured relation with the fingers.

2. The bushing of claim 1, wherein the inner member is a hollow cylindrical sleeve, and the insert is bonded to the cylindrical sleeve.

3. The bushing of claim 2, wherein the insert comprises two sections which are mirror images of each other.

4. The bushing of claim 3, wherein a relatively thin layer of resilient elastomeric material compared to the longitudinal length of the inner member, divides the insert into the two sections in which there are similar grooves and fingers which extend from the thin dividing layer longitudinally of the inner sleeve.

5. The bushing of claim 4, wherein each section of the insert includes, (i) a pair of relatively large voids which extend through each section in parallel relation with the inner sleeve, and (ii) a plurality of aligned pairs of fingers which are in parallel relation, the fingers of each pair of fingers extending in opposite directions from adjacent the inner sleeve into the large voids where they terminate in spaced relation from the ring.

6. The bushing of claim 5, wherein there are at least three pairs of fingers in each of the sections of the insert, and the relatively large voids are generally pie-shaped in relation to the longitudinal axis of the inner sleeve.

7. The bushing of claim 6, wherein the fingers and grooves have substantially the same width.

8. The bushing of claim 7, wherein the resilient elastomeric material is rubber and the inner sleeve is composed of metal.

9. The bushing of claim 8, wherein the cross section of the insert in a first plane resembles two truncated cones with bases which are in abutting relation, and the cross section of the insert in a second plane at ninety degrees to the first plane, resembles two cones with bases which are in abutting relation.

10. The bushing of claim 8, wherein the housing includes a circumferential recess midway between opposing ends thereof for receiving the annular ring protruding around the insert.

11. The bushing of claim 10, wherein the housing is divided into two equal sections which are (i) mirror images of each other, and (ii) removably mounted together around the insert and attached inner sleeve.

12. The bushing of claim 8, wherein the insert and attached inner sleeve are disposed in the outer housing, and the fingers of at least one pair of aligned fingers are of different lengths, measured from the longitudinal axis of the inner sleeve, and the outer housing is flattened in the area of the shorter of the at least one pair of fingers, all of the foregoing being designed to limit travel of the insert and attached inner sleeve within the outer housing in the direction of the shorter of the at least one pair of fingers.

13. The bushing of claim 4, wherein the grooves and fingers of each section are in radial spaced relation from the inner sleeve and extend radially therefrom, the grooves and fingers being in alternating relation around the inner sleeve.

14. The bushing of claim 13, wherein the grooves have a uniform width, so that the fingers have a greater width at their distal ends, farthest spaced from the inner sleeve, than at their proximal ends adjacent the inner sleeve.

15. The bushing of claim 14, wherein the resilient elastomeric material is rubber and the inner sleeve is composed of metal.

16. The bushing of claim 15, wherein the housing includes a circumferential recess between the opposing ends thereof, for receiving the annular ring which circumferentially protrudes from the insert.

17. The bushing of claim 16, wherein the housing is matingly shaped to receive the insert, and includes means for removably fastening the two sections of the housing together.

18. The bushing of claim 17, wherein a cross section of the insert taken longitudinally through the fingers resembles two truncated cones with bases which are in abutting relation.

19. A bushing for an automobile torque strut, comprising:

a) an elongate, rigid inner member having a pair of spaced apart opposing ends and concentric about a longitudinal axis;

b) an insert composed of resilient, elastomeric material, said insert having a pair of opposing ends and a center opening for receiving said inner member, said insert being secured to said inner member;

c) a plurality of resilient elastomeric fingers integrally formed in said insert, defining a plurality of planes and extending in spaced relation from said inner member outwardly in directions away from said longitudinal axis of said inner member;

d) a plurality of grooves in said insert defined by said fingers, said fingers and grooves being sized such that free distal ends of said fingers are free to flex laterally relative to said planes of said fingers;

e) a region in said insert midway between said opposing ends of said insert having a largest diameter about said longitudinal axis of said member;

f) a rigid annular ring embedded in said resilient elastomeric material of said insert in said region of said largest diameter; and g) a housing surrounding said insert, engaging said region of largest diameter and unsecured to said fingers.

20. The bushing of claim 19, wherein said insert comprises two sections which are mirror images of each other and wherein each of said two sections of said insert includes a pair of relatively large voids which extend through each of said two sections in parallel relation with said inner member and wherein said plurality of resilient elastomeric fingers are disposed in said large voids and terminate in spaced relation from said annular ring.

* * * * *